United States Patent [19]
Chandhok

[11] 3,804,575
[45] Apr. 16, 1974

[54] ASSEMBLY FOR MAKING A MOLD
[75] Inventor: Vijay K. Chandhok, Pittsburgh, Pa.
[73] Assignee: Crucible Inc., Pittsburgh, Pa.
[22] Filed: June 15, 1972
[21] Appl. No.: 263,341

[52] U.S. Cl................ 425/405 H, 425/78, 425/175
[51] Int. Cl. ............................ B29c 3/00, B29c 5/00
[58] Field of Search ......... 425/78, 175, 405 H, 405, 425/468, DIG. 125

[56] References Cited
UNITED STATES PATENTS
| | | | |
|---|---|---|---|
| 3,653,792 | 4/1972 | Garrett | 425/78 X |
| 3,635,630 | 1/1972 | Greene | 425/175 |
| 3,230,286 | 1/1966 | Bobvocosky | 425/78 X |
| 3,249,964 | 5/1966 | Shaler | 425/405 H |
| 3,298,067 | 1/1967 | Tencate | 425/175 |
| 3,313,871 | 4/1967 | Vogel et al. | 425/405 H |
| 3,523,502 | 8/1970 | Ewards | 425/405 |

Primary Examiner—Robert L. Spicer, Jr.

[57] ABSTRACT

This is a powder metallurgy process for producing a plurality alloy article, for example such as molds and dies. It comprises producing a ceramic core having a surface corresponding to the desired configuration of the mold or die, placing the core in a container and filling the container and surrounding the core with a particle charge of the alloy from which the mold is to be made, heating the charge to compacting temperature and compacting the charge by the application of isostatic pressure to a final density. Thereafter, the ceramic core is removed to expose the corresponding compacted surface of the alloy charge, which is configurated in accordance with the surface of the core and constitutes the desired mold or die surface.

1 Claim, 3 Drawing Figures

PATENTED APR 16 1974   3,804,575
FIG. 1A   FIG. 1B   FIG. 2
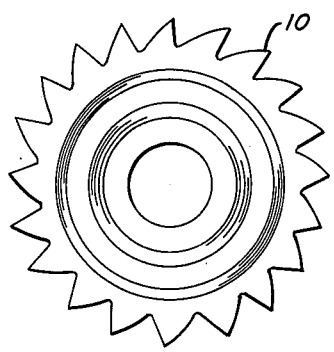
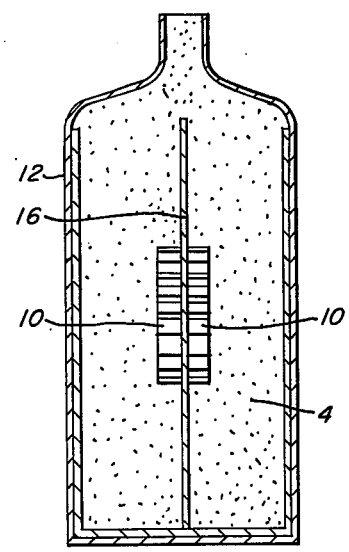
FIG. 3
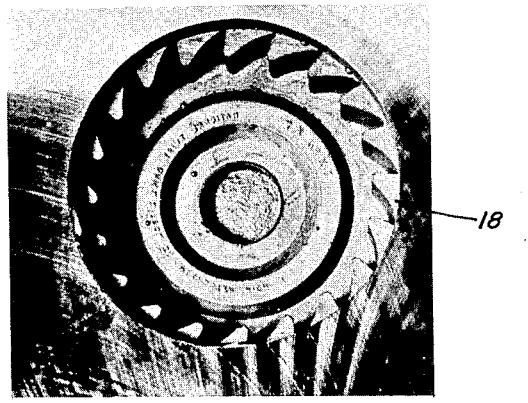

ASSEMBLY FOR MAKING A MOLD

It is customary to produce molds and dies, particularly for the plastics industry from tool steels and superalloys. The conventional procedure is to produce a wooden model or pattern of the desired finished part. From this pattern die replicas are produced for use in rough machining blocks of the desired alloy by die sinking. After rough machining the product is subjected to further finish machining to the desired mold configuration. This practice is characteristically expensive, particularly in view of the extensive machining required.

It is accordingly the primary object of the present invention to provide a method for producing molds and dies that eliminates the need for substantial machining and, therefore, greatly decreases the cost of production.

This and other objects, as well as a complete understanding of the invention, may be obtained from the following description and drawings, in which:

FIGS. 1A and 1B are plan and section views, respectively, of one example of a ceramic core suitable for use in the practice of the invention.

FIG. 2 is a schematic showing of a container with a core therein for use in producing molds in accordance with the invention; and FIG. 3 is a photograph of a mold produced by the use of the ceramic core shown in FIGS. 1A and 1B.

Broadly in the practice of the invention molds and dies are produced by providing a core of ceramic material that is shaped to the configuration desired in the final mold or die. Although various ceramics may be used it is preferred that the ceramic material be characterized by the ability to resist significant size change upon compressive loading at elevated temperatures. For this purpose high alumina-type ceramics are preferred, specifically 95 percent alumina with silica as a binder. Upon production of a ceramic core of the desired configuration, such is placed in a container wherein the surface of the core constituting the desired mold configuration is placed adjacent a charge of alloy particles of a composition from which the mold is to be constructed. After evacuating the container to remove any moisture present therein, the container is sealed against the atmosphere and the charge is heated to a compacting temperature within the range of 1,800° to 2,300°F. While at this temperature the container and charge are compacted, preferably by the use of isostatic pressure which is achieved by placing the container within a fluid pressure vessel of the well-known type that achieves compacting by the use of gas or other fluid pressure media. Compacting is achieved to provide densities approaching 100 percent of theoretical and in any event of at least about 98 percent. After compacting is completed the ceramic core is removed from the compacted charge to expose the adjacent compacted surface of the charge which is of a configuration corresponding to that of the core and desired for the die or mold.

As a specific example of the practice of the invention a solid ceramic core 10 of the configuration of a typical gear wheel as shown in FIGS. 1A and 1B was produced from a ceramic composition of 95 percent alumina, 5 percent silica; the silica is used as a binder. Ceramic cores for use in accordance with the present invention are produced by forming a "green" compact from an admixture of particles of the alumina and silica. The compact is then fired at elevated temperature to fuse and densify it. Two ceramic cores 10 were placed in a cylindrical mild-steel container 12 and alloy powder 4 of a size consist of —80 mesh (U.S. Standard) and of the following composition, in weight percent, was packed around the cores 10 and filled the container:

| Material | Chemical composition, percent | | | | | | | | |
|---|---|---|---|---|---|---|---|---|---|
| | C | Co | Ti | Al | Cr | Mo | B | Zr | V | Ni. |
| IN 100 | .18 | 15.0 | 4.7 | 5.5 | 10.0 | 3.0 | .014 | 0.06 | 1.0 | Bal. |

A thin sheet of mild steel, indicated in FIG. 2 as 16, was positioned, as shown in the Figure, separating the cores 10. The sheet 16 is preferred for use in the practice of the invention to indicate the position of the cores within the container and to facilitate removal and separation after compacting is completed.

The assembly, as shown in FIG. 2, was evacuated to remove any moisture from the interior of the container and the container was then sealed. The sealed container was placed in an oven (not shown) and heated to a temperature of about 2,175°F for six hours. It was then placed in an autoclave whereupon by the application of fluid pressure of about 13,700 psi the container and charge were compacted to achieve a particle density approaching 100 percent of theoretical. Pressure medium employed was nitrogen gas. After compacting the assembly was removed from the pressure vessel and permitted to cool to room temperature, whereupon the compact was separated at the divider 16 and the ceramic cores were removed to expose two compacts having surfaces corresponding to the core configuration. One of these compacts, indicated as 18 in FIG. 3, constitutes a concave mold or die having a surface requiring little or no machining for final use in the production of gear wheels. By the use of isostatic compacting it is possible to achieve densities approaching 100 percent of theoretical and, therefore, the mold in FIG. 3 is in every respect similar to that conventionally produced by employing rough and finished machining of a cast product of the same alloy. As in the case of the mold of FIG. 3 little or no machining is required.

I claim:

1. An assembly for use in the manufacture of compacted alloy articles, such as molds and dies, said assembly comprising a container sealed against the atmosphere and having therein a core of a ceramic material resistant to significant size change upon compressive loading at elevated temperatures and having a surface corresponding to a desired configuration of a mold or die and a particle charge of an alloy from which said mold or die is to be constructed positioned within said container and adjacent said surface of said core.

* * * * *